United States Patent [19]

Bauman

[11] 4,424,013
[45] Jan. 3, 1984

[54] ENERGIZED-FLUID MACHINE

[76] Inventor: Richard H. Bauman, 76 Marshall Concourse, Cliffwood Beach, N.J. 07735

[21] Appl. No.: 226,420

[22] Filed: Jan. 19, 1981

[51] Int. Cl.$^3$ .............................................. F04C 5/00
[52] U.S. Cl. .................................. 418/48; 118/61 B; 118/55; 123/242
[58] Field of Search ...................... 418/55, 48, 61 B; 123/242

[56] References Cited

U.S. PATENT DOCUMENTS

| 3,288,078 | 11/1966 | Monroe | 418/61 B |
| 3,779,521 | 12/1973 | Godines | 418/48 |
| 3,822,972 | 7/1974 | Ogly | 418/48 |
| 3,960,470 | 6/1976 | Kinder | 418/61 B |

*Primary Examiner*—Charles J. Myhre
*Assistant Examiner*—Carl Stuart Miller
*Attorney, Agent, or Firm*—S. W. Sokolowski

[57] ABSTRACT

According to the exemplary embodiment shown, the machine comprises a housing having a chamber formed therewithin which is circumscribed by a plurality of spiralled, parallel and arcuate lands with intervening, narrow grooves, and a rotor journalled therewithin, the rotor having a plurality of spiralled, parallel and arcuate grooves with intervening, narrow ribs. The rotor has a ring-type gear mounted therewithin, and the latter meshes with a gear centrally mounted on a rotor-traversing shaft. The arcuate grooves and ribs are one less in number than the arcuate lands and narrow grooves, and the journalling of the rotor and mesh of the gears causes the rotor to describe an epicyclic rotation relative to the housing. The depicted embodiment comprises an internal combustion engine, however the machine is useful as an expander, fluid motor, and the like.

4 Claims, 11 Drawing Figures

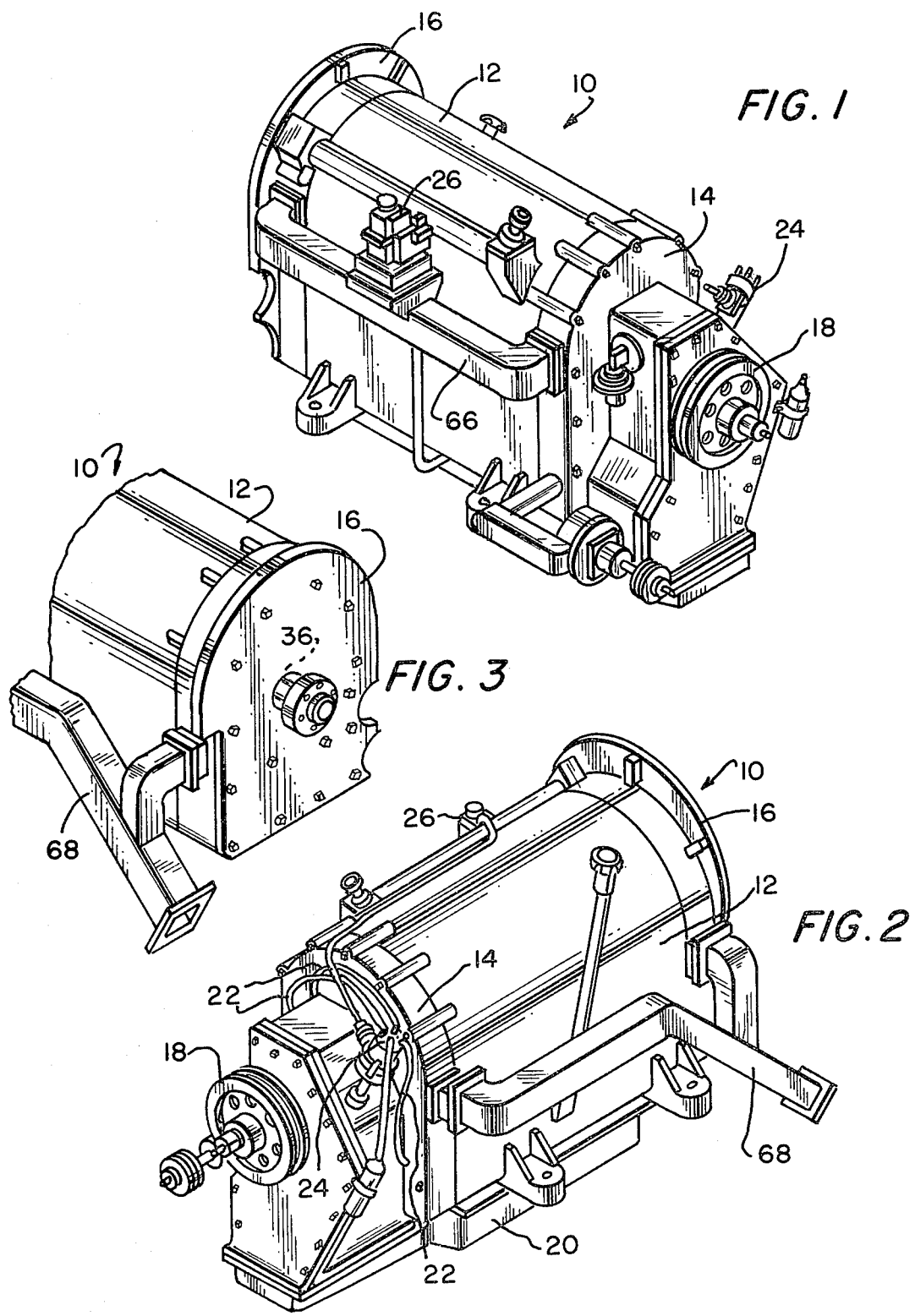

ENERGIZED-FLUID MACHINE

This invention pertains to energized-fluid machines which have rotors which describe an epicyclic rotation within a chamber, such as those of the Wankel type, and in particular to such a machine which provides an improved, progressive-combustion, rotary-axial flow of the energized fluid, when used as an internal combustion engine, and progressive, rotary-axial flow of the expanding or motive fluid, when used as an expander or fluid motor.

It is an object of this invention to set forth an improved energized-fluid machine which requires no extraneous valving devices, and provides a progressive, rotary-axial flow of the combustion, expanding, or motive fluid, whereby the output power is turbine-like.

It is particularly an object of this invention to set forth an energized-fluid machine, comprising a housing having spaced-apart end walls; said housing defining therewithin a chamber, intermediate said walls, having a longitudinal axis; rotor mounting means supported in said end walls; a rotor mounted in said mounting means for rotation thereof within said chamber; and fluid inlet and outports formed in at least one of said end walls; said housing having means circumscribing said chamber defining a given plurality of parallel, arcuate lands extending lengthwise of said housing between said walls; wherein each of said lands defines, with another thereof adjacent thereto, a radial groove, said plurality of lands defining a same given plurality of grooves; said rotor having a differing plurality of arcuate grooves formed therein and extending lengthwise thereof adjacent thereto, a radical rib, said differing plurality of arcuate grooves defining a same plurality of ribs as said arcuate grooves; said lands and radial grooves, and said arcuate grooves and radial ribs are spirally formed axially of said housing; said lands and radial grooves describe a spiral of a given arc; and said arcuate grooves and said radial ribs describe a spiral of an arc which differs from said given arc; and said rotor mounting means comprises journals formed in said end walls, and a shaft; said rotor being hollow centrally thereof, and having gear means fixed therewithin; and said shaft having ends thereof journalled in said end walls journals, and having a centrally mounted gear fixed thereto in mesh with said gear means; wherein said ribs occlude and open said inlet and outlet ports during rotation of said rotor within said chamber.

Further objects of this invention, as well as the novel features thereof, will become more apparent by reference to the following description taken in conjunction with the accompanying figures, in which:

FIGS. 1, 2 and 3 are right-front, left-front and left-rear isometric projections, respectively, of the novel energized-fluid machine, according to an embodiment thereof;

Figure 4:
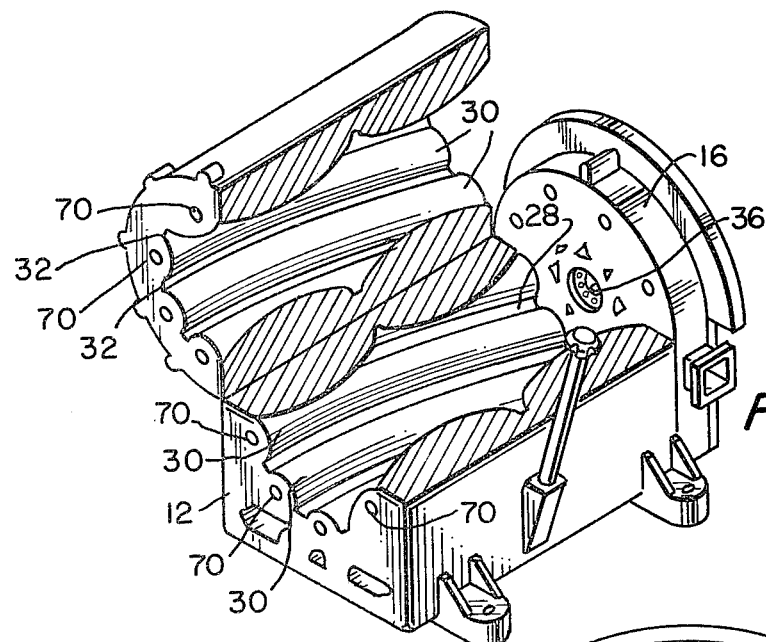
FIG. 4 is an isometric projection of the FIGS. 1-3 embodiment, with the front end wall removed, half of the housing raised and rotated to one side, and showing the inlet and outlet ports formed in the rear end wall.

As shown in the figures, the novel energized-fluid machine 10, according to the depicted internal-combustion engine embodiment thereof, comprises a housing 12 which defines the engine block, and front and rear walls 14 and 16 which define the front and rear heads of the engine. The machine has a conventional damper pulley 18, crankcase oil pan 20, ignition system with spark plug wires 22 and distributor 24, and carburetion system with a carburetor 26.

Within the housing 12 or engine block is a chamber 28, the latter being circumscribed by eight parallel, spiralled arcuate lands 30, the latter defining a same number of narrow, radial grooves 32 therebetween. The lands and grooves describe a ninety degrees of arc spiral, from one end of the chamber 28 to the opposite end thereof. The front and rear walls 14 and 16, or heads of the engine, have bearing journals 34 and 36 formed therewithin in which to journal opposite ends of the shaft 38. The shaft 38 has a centrally mounted gear 40 fixed thereon which meshes with a ring-type gear 42 fixed within the hollow denter of a rotor 44.

The rotor 44 has formed thereon seven parallel, spiralled arcuate grooves 46, the latter defining a same number of narrow, radial ribs 48 therebetween. The arcuate grooves and ribs describe an arc spiral of a little more than one hundred and two degrees (being exactly: 102.8571°). The rotor 44 is rotatably supported on the shaft 38 for operative engagement of the grooves 46 and ribs 48 thereof with the lands 30 and grooves 32 of the engine block.

The housing 12 or engine block, in which the chamber 28 is formed, defines a sort of stator for the rotor 44. Now, it may be useful to explain how the spiral or helical definitions or pitches of the housing/stator and rotor were determined for the illustrated embodiment. Initially, the determination proceeds from a consideration of the number of degrees of arc of combustion flame front one wishes. In the case of the illustrated embodiment, a three hundred and sixty degree flame front is used. The housing 12, or stator, is construed as having eight functional chambers. Each groove 32, bounded by a pair of lands 30, defines such a functional chamber. The machine 10 operates on the four-cycle principle of power. Accordingly, to determine the number of combustion chambers in the housing/stator 12, on such a four-cycle principle of power operation, the total of chambers is divided by two. The result, then is four. By next dividing the flame front (three hundred and sixty degrees) by four, i.e., the number of combustion chambers, it is found that a ninety degree (90°) helical pitch or spiral is required to satisfy the flame front performance. Where the housing/stator 12 has eight chambers, the rotor 44 has but seven. Thus, for the rotor 44 to travel completely around the housing/stator 12, to accomplish the predetermined three hundred and sixty-degree flame front, it must execute one full revolution plus a further one-seventh revolution. The seven chambers of the rotor, of course, are the seven grooves 46 which are bounded by the ribs 48. Now, to determine the necessary spiral or helical definition or pitch of the rotor 44, the number of degrees of the flame front (i.e., three hundred and sixty) is divided by the number of chambers formed in the rotor 44. The result is approximately fifty-one and a half degrees (actually: 51.428571°). To this figure one adds the number of degrees of flame front; this intermediate result is approximately four hundred and eleven and a half degrees (actually: 411,42857°). Finally, the latter figure is divided by the number of combustion chambers in the housing/stator 12. Hence, the product of such division is just shy of one hundred and three degrees (actually: 102.85714°).

In both the front and rear walls 14 and 16 of the housing 12 are formed inlet and outlet ports 50 and 52 respectively. The inlet ports, front and rear, and the outlet ports, front and rear, are in direct linear alignment with each other.

Set within the front wall 14 are four equally spaced apart, circumferentially of the chamber 28, spark plugs 54. As is conventional in known internal combustion engines, the machine 10 has gearing and timing mechanisms (not shown) to sequence the firing of the spark plugs 54 following the "compression" of the fuel mixture at prescribed locations within the chamber 28. Accordingly, such mechanisms will not be described here.

Figure 6:
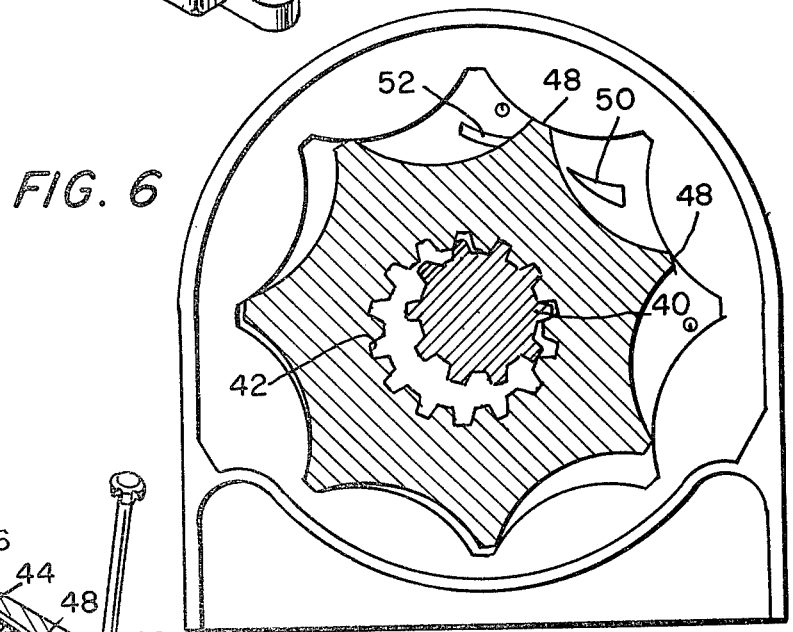
FIGS. 6, 7, 8 and 9 are illustrative line drawings depicting the relationships of the rotor, chamber housing, and ports during the events of fuel intake, compression, power, and exhaust, as the same occur within the machine.
Figure 5:
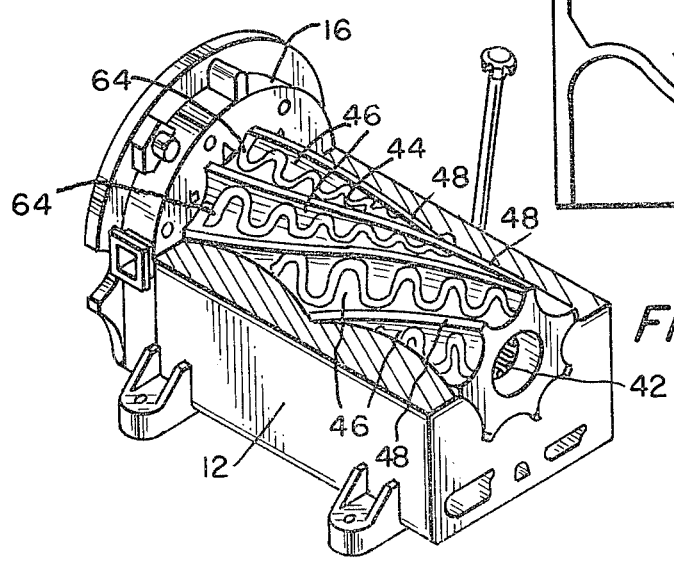
FIG. 5 is an isometric projection, similar to FIG. 4, showing the rotor positioned in the housing.
Figure 7:
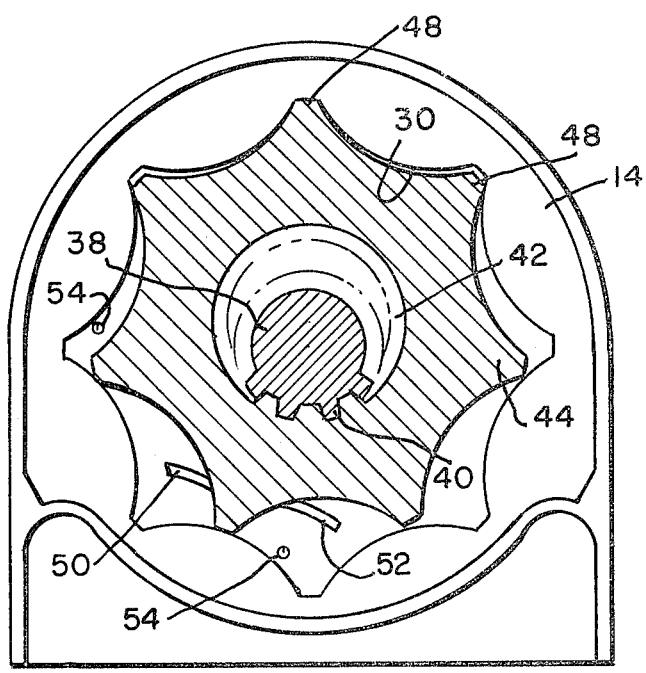
Figure 8:
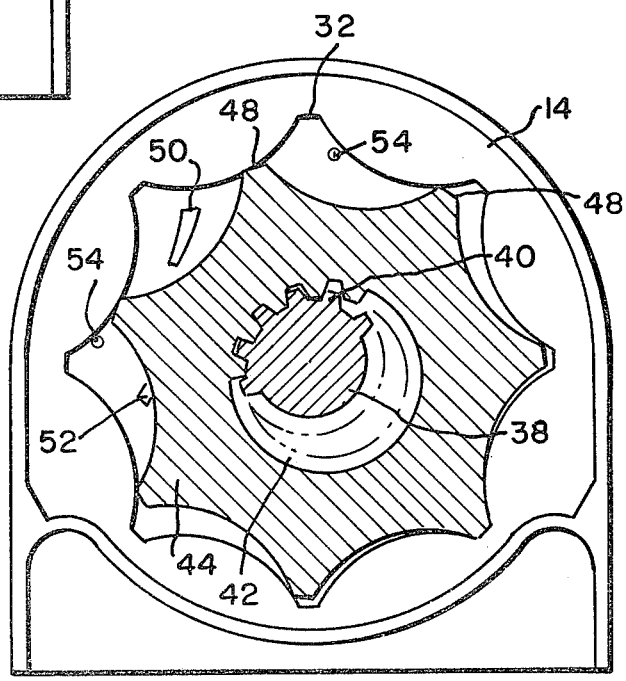

With particular reference to FIGS. 6–8, it can be seen that, at the front wall 14 of the machine 10, two ribs 48 of the rotor 44 are positioned astride an inlet port 50, as the rotor is rotating counterclockwise. The port admits the fuel mixture as the rotor continues its epicyclic rotation. Next, the same two ribs 48 are positioned astride a land 30, having closed toward the latter; hence, the fuel mixture is subjected to compression. Sequentially, the rotor is turned a few degrees of arc, counterclockwise to where the same two ribs 48 are now positioned astride one of the narrow grooves 32 whereat, in adjacency thereto, is one of the spark plugs 54. At the optimum time, the spark plug 54 fires, and the rotor 44 is moved to the positioning shown in FIG. 9. Now the ribs 48 are astride an exhaust port 52, and the exhaust gases exit therethrough.

Due to the spiralling of the lands and arcuate grooves inlet ports 50 in both the front and rear walls of the machine 10 admit the fuel mixture into the chamber 28. However, the inlet port 50 in the front wall 14 opens earlier than the inlet port 50 in the rear wall 16; this is so, because the spiralling of the rotor 44 is more than ninety degrees of arc—twelve-plus degrees; more. Now, through this innovation, when the front of the machine has completed compression of the fuel mixture, the rear of the machine is still concluding compression. Also, and more importantly, when the front of the machine has ignition, in the power positioning of the rotor 44 thereat, the rear of the machine is just concluding compression and coming into the power positioning. Thus, with ignition, the exploding mixture travels progressively, smoothly, and in a rotary-axial flow from the front to the rear. This progressive, uniform, rotary-axial flow of energy drives the rotor 44 in a smooth, turbine-like rotation.

Figure 9:
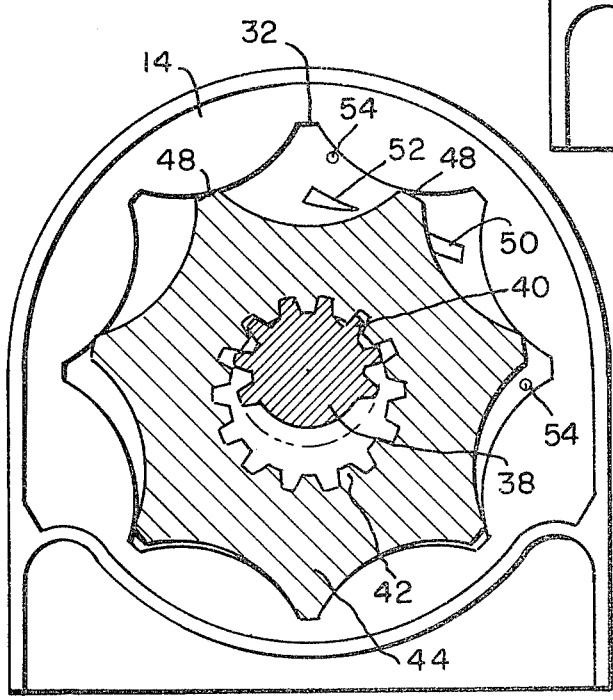

In sequence, of course, a next set of inlet ports 50 proceed to admit the fuel mixture into the chamber 28 for another cycle of intake, compression, power, and exhaust. With reference to FIG. 7, whereat the aforesaid power positioning was described, it will be seen that an inlet port 50 is exposed to a subchamber defined by a pair of ribs (at approximately ten and eleven o'-clock in the figure) and a thereadjacent, bridged-across groove 32. In FIG. 9, which illustrated the exhaust positioning of the rotor for the aforedescribed operation, the latter subchamber is proceeding to compress the admitted fuel mixture. Thus, it is this subchamber which provides the succeeding power "stroke" of the machine.

Figure 10:
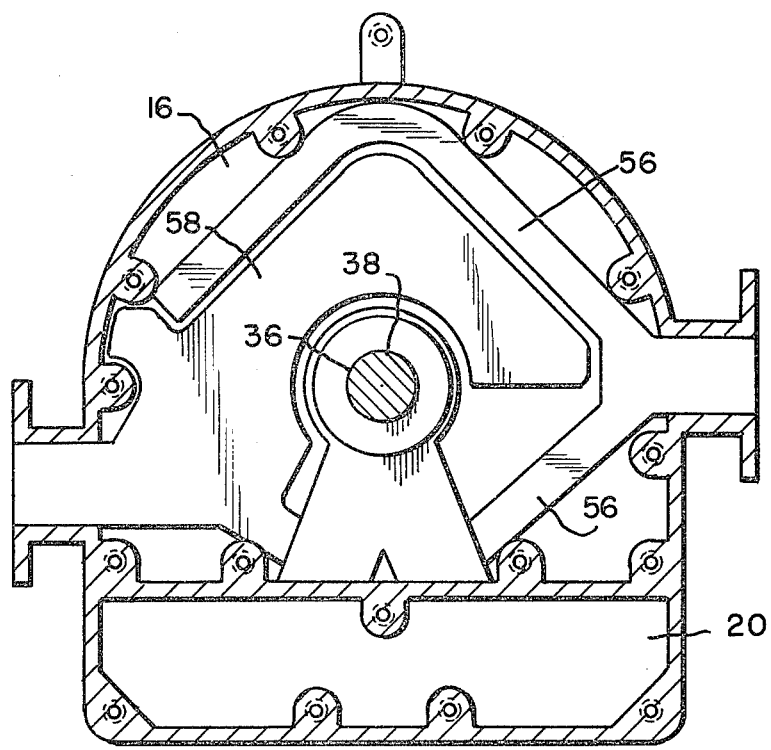
FIG. 10 is an elevational view of the machine showing the inlet and outlet conduits, within the rear wall/head, the cover therefor having been removed.
Figure 11:
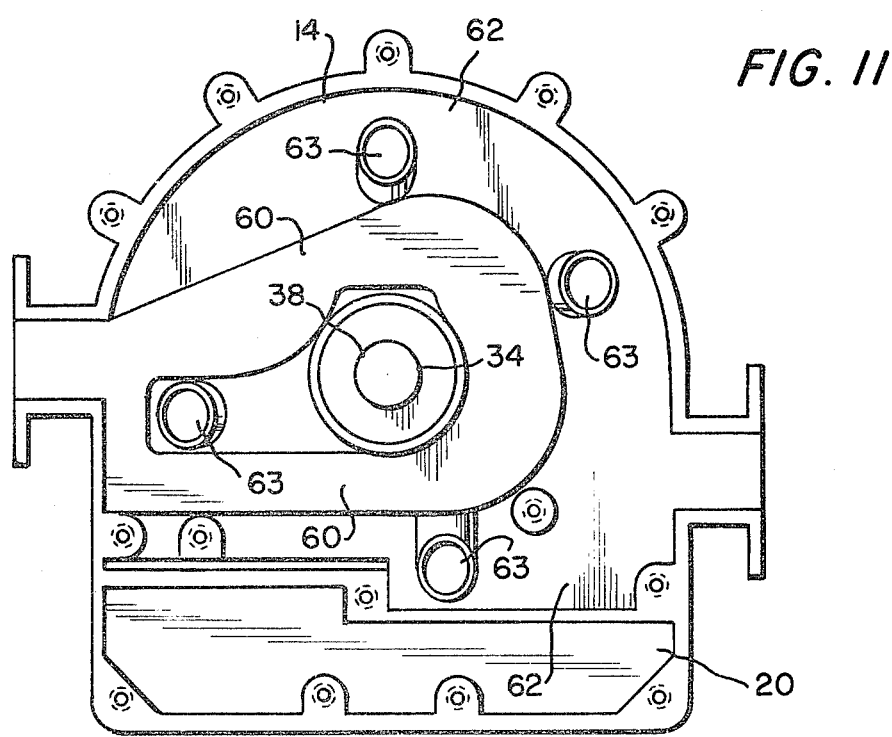
FIG. 11 is an elevational view of the machine again showing the inlet and outlet conduits and spark plug tubes, within the front wall/head, the cover therefor also having been removed.

As can be seen in FIGS. 10 and 11, the rear and front heads or walls 16 and 14 have voids therewithin, and covers therefor having been removed. Within these voids are fitted inlet and outlet conduits 56 and 58, respectively, for the rear head, and inlet and outlet conduits 60 and 62 for the front head. The conduits communicate with the respective inlet and exhaust ports 50 and 52. In addition, the front head 14 has spark plug access tubes 63 mounted thereon. To insure a uniform propagation of the ignited fuel mixture, the rotor 44 has formed therein, in the spiralled arcuate grooves 46, as can be seen in FIG. 6, serpentine channels 64. Accordingly, the pressure of the flame front is readily conducted, axially, lengthwise of the grooves 46, and the uniformly distributed pressure is addressed to the whole length of the rotor.

The machine 10 has an intake manifold 66 which communicates with the front and rear heads 14 and 16, and supports the carburetor 26 thereupon, and an exhaust manifold 68 also coupled to and communicating with the front and rear heads.

All accessories, carburetor 26, distributor 24, and an oil pump, pump drive, etc., most of which are not shown, are conventional "automotive" types which are available from manufacturers and shops. Accordingly, my machine 10 requires no specially designed accessories and/or parts other than the rotor 44 and housing 12. As an internal combustion, spark-plug-fired engine, my machine follows the known cycle of operation, ignition timing, and the like, and for these reasons I do not depict or describe such functionings. The especial novelty of my machine resides in the radical design of the rotor 44 and housing 12. With the axially-disposed propagation of the ignited fuel mixture, and the slightly delayed communication of front and rear inlet and outlet ports, imparts a smooth power stroke. The progressive combustion and even expansion within the chamber 28 provides a turbine-like action of the rotor 44. Hence, there is a continuous and steady force on the output shaft 38. Due to the disparity in sizes of the gears 40 and 42, the rotor "walks" around the housing 12. There is substantially no sliding or rubbing as in reciprocating and some rotary machines. Discounting the rotations of the distributor rotor (by gearing derived from the shaft 38) and the oil pump (also driven by a take-off from the shaft 38), my machine has only two moving parts: the rotor 44 and the shaft 38. The axially-extended flame propagation provides a greater time frame in which the combustion and expansion cycles may be executed. Too, this prolongation assures a more complete burning, reduces pollutants, can accommodate a leaner, less expensive fuel mixture, and manifests a more uniform heat distribution within the chamber 28 and in the housing 12. As for cooling the housing 12, the latter has eight coolant channels 70 formed axially therein. Optionally, these channels 70 may receive liquid or gas coolant cycled therethrough by a pump or the like. Differing from reciprocating-piston machines (i.e., engines) which experience excessive heat at one location—at the top of the housing—the heat generated in my machine travels cyclically about the housing 12. Therefore, machine 10 does not produce localized and troublesome hot spots.

While I have described my invention in connection with a specific embodiment thereof, it is to be clearly understood that this is done only by way of example and not as a limitation to the scope of my invention as set forth in the objects thereof and in the appended claims. For instance, the "twist" of the housing lands 30 and the rotor ribs 48 may be altered to increase or decrease the time delay in ports-communication between the front and rear heads 14 and 16 as desired. I show a rotor 44 with seven ribs 48 and a housing with eight lands 30; well, this is exemplary, only. All that is required is for there to be one less rib 48 than the number of lands 30. Now, these and all other alterations or modifications of my machine which will occur to others proceed from my teachings herein. Accordingly, such alterations and modifications are deemed to be within the ambit of my invention and comprised by the appended claims.

I claim:

1. An energized fluid machine, comprising:
   a housing having spaced apart end walls;
   said housing defining therewithin a chamber, intermediate said walls, having a longitudinal axis;
   rotor mounting means supported in said end walls;
   a rotor mounted in said mounting means for rotation thereof within said chamber; and
   fluid inlet and outlet ports formed in at least one of said end walls;
   said housing having means circumscribing said chamber defining a given plurality of parallel, arcuate lands extending lengthwise of said housing between said walls; wherein
   each of said lands defines, with another thereof adjacent thereto, a radial groove, said plurality of lands defining a same given plurality of grooves;
   said rotor having a differing plurality of arcuate grooves formed therein and extending lengthwise thereof in parallel;
   each of said arcuate groove defines, with another thereof adjacent thereto, a radial rib, said differing plurality of arcuate grooves defining a same plurality of ribs as said arcuate grooves;
   said lands and radial grooves, and said arcuate grooves and said radial ribs are spirally formed axially of said housing;
   said lands and radial grooves describe a spiral of a given arc; and
   said arcuate grooves and said radial ribs describe a spiral of an arc which differs from said given arc; and
   said rotor mounting means comprises journals formed in said end walls, and a shaft;
   said rotor being hollow centrally thereof, and having gear means fixed therewithin; and
   said shaft having ends thereof journalled in said end wall journals, and having a centrally mounted gear fixed thereto in mesh with said gear means; wherein
   said ribs occlude and open said inlet and outlet ports during rotation of said rotor within said chamber; wherein
   each of said end walls has four inlet ports and four outlet ports formed therein;
   said inlet ports in said end walls, and said outlet ports in said end walls being in linear alignment with each other; and
   upon one of said ribs just commencing to uncover a given one of said inlet ports in one of said end walls, said one rib is coincidentally just completing occlusion of a given one of said outlet ports in the other of said end walls.

2. An energized-fluid machine, according to claim 1, wherein:
   said mounting means, gear and said gear means within said rotor cooperatively define means causing said rotor to rotate epicyclically within said housing.

3. An energized-fluid machine, according to claim 1, wherein:
   said spiral of a given arc comprises an arc of ninety degrees; and
   said spiral of said arcuate grooves and radial ribs comprises an arc of one hundred and two and a fraction degrees.

4. An energized-fluid machine, according to claim 1, wherein:
   said inlet ports are equally spaced apart, radially of said axis.

* * * * *